United States Patent [19]

Feig et al.

[11] Patent Number: 5,177,796
[45] Date of Patent: Jan. 5, 1993

[54] IMAGE DATA PROCESSING OF CORRELATED IMAGES

[75] Inventors: Ephraim Feig, Briarcliff Manor; Victor S. Miller, Peekskill; James H. Morgan, Ossining, all of N.Y.

[73] Assignee: International Business Machines Corporation, Armonk, N.Y.

[21] Appl. No.: 600,480

[22] Filed: Oct. 19, 1990

[51] Int. Cl.$^5$ .............................................. G06K 9/36
[52] U.S. Cl. .................................... 382/56; 358/433; 364/715.02
[58] Field of Search .......................... 382/56; 358/433; 364/715.02

[56] References Cited

U.S. PATENT DOCUMENTS 4,179,709 12/1979 Workman ............................. 358/433
4,698,689 10/1987 Tzou ..................................... 382/56
4,797,741 1/1989 Sato et al. ............................. 382/56

OTHER PUBLICATIONS

Ernest L. Hall, Computer Image Processing and Recognition, Academic Press, 1979, pp. 342-367.

Primary Examiner—Leo H. Boudreau
Assistant Examiner—David Fox
Attorney, Agent, or Firm—J. David Ellett, Jr.

[57] ABSTRACT

To encode data representative of correlated images, a sequence of arrays of source image data is provided in which each array is representative of an image. Each array of source image data is partitioned into a plurality of source image-data blocks. For each sequence of source image-data blocks, at least one prototypical image-data block is derived from at least a portion of the source image data of the sequence. For each source image-data block, a translation coefficient and a number of scaling coefficients equal to the number of prototypical image-data blocks associated with the sequence are determined. A difference image-data block is formed for each source image-data block from elements of the source image-data block minus the associated translation coefficient minus the sum in turn of each associated scaling coefficient multiplied by elements of the corresponding prototypical image-data block. Each difference image-data block is subjected to an image-data compression procedure to form a set of data-compression-encoded difference image-data elements. Each set of data-compression-encoded difference image-data elements may be stored in digital storage in association with the scaling coefficients and the translation coefficient associated with the corresponding source image-data block.

22 Claims, 1 Drawing Sheet

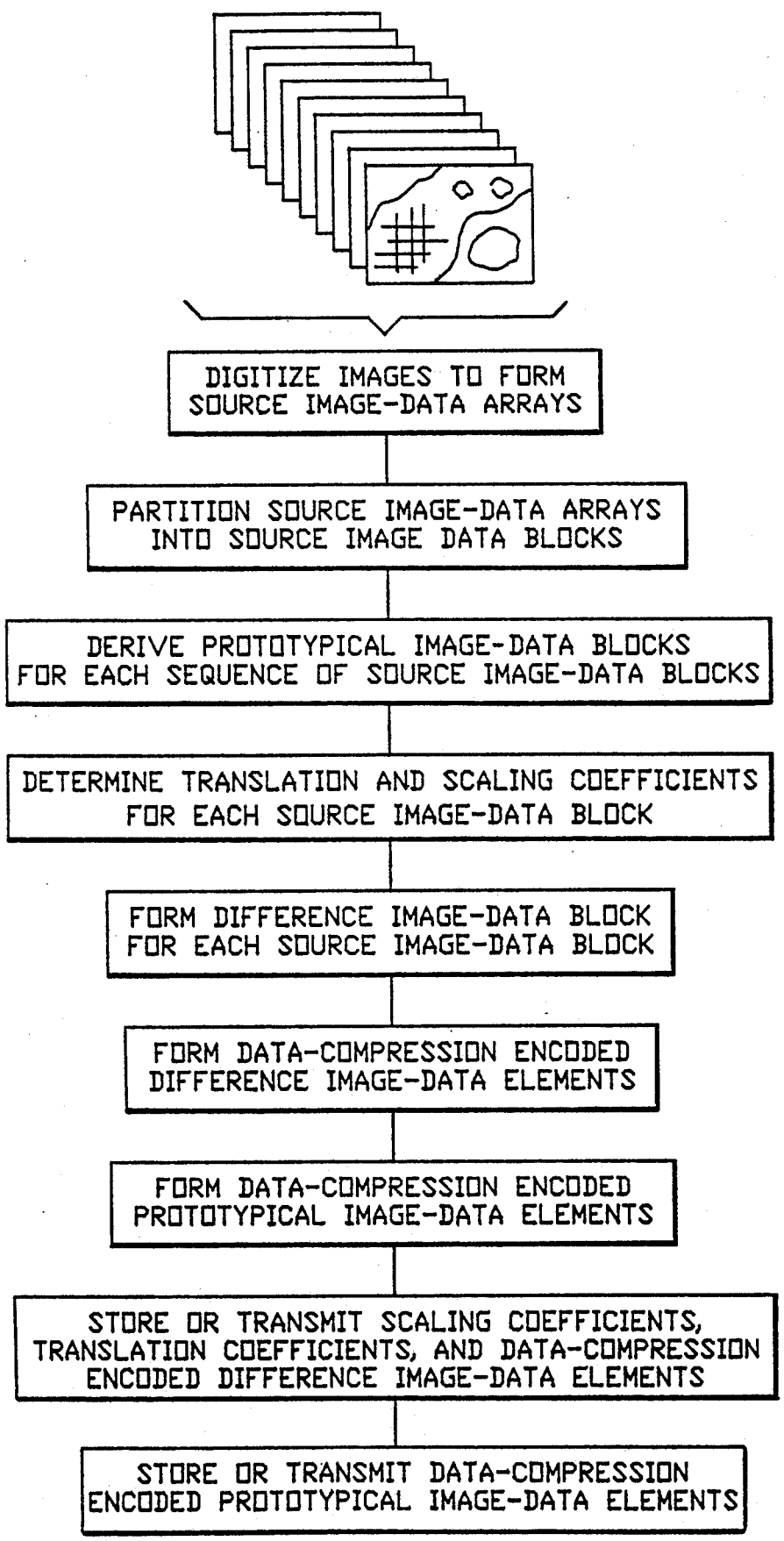

5,177,796

IMAGE DATA PROCESSING OF CORRELATED IMAGES

FIELD OF THE INVENTION

The present invention concerns a method for data compression of image data, such as multi-band continuous-tone data obtained from radar-imaging instruments.

BACKGROUND ART

The digital representation of a visual image by digitally encoding each picture element making up the image generally requires a great quantity of image data. To process and store such image data requires digital processors with large storage capacities, which tends to increase the cost of such processors. Rapid transmission of such quantities of digital image data requires high-capacity data-transmission channels, which generally tend to be expensive. Transmission of such image data on lower-capacity data-transmission channels can be impractically slow.

A number of schemes have been devised for "compressing" digital data which represents a digitized visual image by encoding the data in such a way that the original image—or a visually-acceptable facsimile of the image—can be reconstructed from the encoded data even though the quantity of the image data is reduced relative to a direct digital representation of each picture element of the image. Conventional compression schemes for continuous-tone image data which do not entail a loss of image quality typically achieve data-compression ratios of three to one or less. Frequently, the data-compression ratios are less than two to one.

In many applications image data from a sequence of related images must be processed. The images in such a sequence are often highly correlated. For example, in processing typical multi-band radar images, hundreds of different images of the same scene are recorded, each corresponding to a different spectral band. Sequences of images representing motion—such as the images forming the frames of digital television—also tend to be highly correlated.

As disclosed in the book *Computer Image Processing and Recognition* by Ernest L. Hall (Academic Press, 1979), pages 342 through 367, predictive and interpolative coding techniques have been proposed for transmitting digital television images. As explained on pages 345 and 346, in a general predictive coding system, an equation of prediction is assumed between a present picture value and n-1 past picture values. Minimizing a mean squared error between the actual picture values and the predicted values gives an optimum prediction method. One form of predictive image coding system includes an encoder which computes an error between a current value and a predicted value. The error is quantized and transmitted through a communication channel to a decoder system. The decoder system forms a received signal by adding the quantized error to the computed predicted value. In one predictive coding technique for digital television described on pages 355 and 356 of the Hall book, each picture element in a digital television frame is predicted using a set of previously scanned elements. Specifically, the differential pulse code modulation ("DPCM") predictor $\hat{f}(x,y,t)$ for the picture element $f(x,y,t)$ at location x,y at time t is written:

$$\hat{f}(x,y,t) = \alpha f(x-1,y,t) + \beta f(x,y-1,t) + \gamma f(x,y,t-1).$$

The prediction parameters $\alpha, \beta, \gamma$ are selected to minimize a mean squared prediction error. According to the Hall book, by expressing the mean squared error in terms of correlation values and differentiating with respect to the prediction parameters, a set of algebraic equations is given from which the desired prediction parameters can be found.

Although the predictive and interpolative coding disclosed in the book by Hall cited above provides a limited increase in efficiency in coding digital television images, a need exists for greater efficiency in processing sequences of images—particularly sequences of highly correlated images such as the images corresponding to the bands of multi-band ground survey radar.

SUMMARY OF THE INVENTION

We have invented a method for efficiently encoding data representative of correlated images which avoids problems of the prior art noted above.

Broadly, the method of the invention includes the step of providing a sequence of arrays of source image data. Each array of source image data is representative of an image. The sequence of arrays of source image data may be obtained, for example, by digitizing a sequence of images or by receiving digital image data over a communication channel from a remote imaging instrument such as a multi-band radar unit.

Each array of source image data is partitioned into a plurality of source image-data blocks. Each source image-data block has source image-data elements which may conveniently be identified by an associated block data-element index. Corresponding source image-data blocks which are associated in turn with each array of the sequence of arrays of source image data define a sequence of source image-data blocks. The number of sequences of source image-data blocks equals the number of blocks into which each array of source image data is partitioned.

For each sequence of source image-data blocks, at least one prototypical image-data block is derived from at least a portion of the source image data of the sequence. Each prototypical image-data block has prototypical image-data elements, each of which can be indexed by one of the block data-element indices.

The method of the invention further includes the step of determining—for each source image-data block in each sequence of source image-data blocks—a translation coefficient and a number of scaling coefficients equal to the number of prototypical image-data blocks associated with the sequence. The scaling coefficients and the translation coefficient respectively have values collectively to at least approximately minimize a first sum of squared summands. Each summand is associated with one of the block data-element indices and is the square in sum of the translation coefficient plus a second sum of each of the scaling coefficients in turn multiplied by an element associated with the summand block data-element index of the prototypical image-data block associated with the scaling coefficient minus an element associated with the summand block data-element index of the source image-data block. The first sum is taken over all of the block image-data indices of the source image-data block.

The method of the invention also includes the step of forming a difference image-data block for each source image-data block in each sequence of source image-data blocks. Each difference image-data block has difference image-data elements, each of which is associated with one of the block data-element indices defining a difference-element index. Each difference image-data element is derived from an element associated with the difference-element index of the source image-data block minus the translation coefficient associated with the source image-data block minus the sum in turn of each scaling coefficient associated with the source image-data block multiplied by the element associated with the difference-element index of the prototypical image-data block associated with the scaling coefficient.

The method of the invention further includes the step of subjecting each difference image-data block to an image-data compression procedure to form a set of data-compression-encoded difference image-data elements.

Finally, the method of the invention includes the step of storing each set of data-compression-encoded difference image-data elements in digital storage in association with the scaling coefficients and the translation coefficient associated with the corresponding source image-data block.

Preferably, the method of the invention includes the step of subjecting each prototypical image-data block to an image-data-compression procedure to form a set of data-compression-encoded prototypical image-data elements and storing each such set of data-compression-encoded prototypical image-data elements in digital storage.

The source image data can be reconstructed from the data-compression-encoded difference image-data elements, the associated scaling coefficients, the associated translation coefficients, and the data-compression-encoded prototypical image-data elements by a procedure described in detail below which is basically the reverse of the method set forth above for encoding the source image data.

Each source image-data block preferably represents an image block of the image corresponding to the array of source image data which includes the source image-data block. Preferably, each image block represented by a source image-data block is essentially rectangular. It is particularly preferred for each image block to be essentially square.

Each set of prototypical image data is preferably obtained by averaging on an element-by-element basis corresponding elements of at least a subset of the arrays of source image data in the sequence of arrays of source image data. Alternatively, each prototypical image-data block may represent a source image-data block. In that case, the formation of difference image-data blocks is preferably carried out sequentially in a telescoping fashion.

The method of the invention can be carried out to advantage on a digital computer workstation. A workstation having an image-capture input capability and a graphics display output is preferred. For communications applications, it is preferred to have two digital processors linked by a communication channel. A first of the processors can encode image data representing source images in accordance with the invention and transmit the encoded data to the second processor over the communication channel. The second processor can then decode the data in accordance with the invention for reconstructing the source images.

BRIEF DESCRIPTION OF THE DRAWING

FIG. 1 is a flow diagram of a preferred embodiment of the method for encoding data of the invention.

PREFERRED EMBODIMENTS FOR CARRYING OUT THE INVENTION

Each image in a sequence of images is digitized to produce an array of pixel data which represents the image. The array of pixel data for each image is preferably partitioned into image-data blocks corresponding to a partitioning of the image into image blocks. The image blocks are preferably square, with image blocks of a size corresponding to 128 pixels by 128 pixels or 64 pixels by 64 pixels being particularly preferred. However, for certain applications, the blocks need not be square or of a size corresponding to a power of two.

Each image-data block of the sequence of corresponding image-data blocks from the sequence of images is processed according to the same procedure. A number of prototypical images for the sequence of image-data blocks are chosen. The preferred number of prototypical images—denoted K—depends in part on the statistics of the images of the sequence.

In a first preferred embodiment, a single prototypical image data block denoted $P_1$ is used, so that $K=1$. The prototypical image-data block $P_1$ of the first preferred embodiment is an average of the corresponding image-data blocks of the sequence of image-data blocks on a corresponding-pixel by corresponding-pixel basis, with some of the least significant bits dropped off.

Once the prototypical image-data block $P_1$ has been determined a scaling coefficient $a_{j,1}$ and a translation coefficient $b_{j,1}$ are computed for each source image-data block $I_j$. The two coefficients $a_{j,1}$ and $b_{j,1}$ are approximate solutions to the matrix-vector equation:

$$\begin{pmatrix} \sum_k P_1^2(k) & \sum_k P_1(k) \\ \sum_k P_1(k) & N \end{pmatrix} \begin{pmatrix} a_{j,1} \\ b_{j,1} \end{pmatrix} = \begin{pmatrix} \sum_k P_1(k) I_j(k) \\ \sum_k I_j(k) \end{pmatrix},$$

where $I_j(k)$ and $P_1(k)$ are the respective pixel values of the source image-data block $I_j$ and the prototypical image block $P_1$, and N is the total number of pixels in each image block.

It should be appreciated that the scaling coefficient $a_{j,1}$ and translation coefficient $b_{j,1}$ obtained above are those which minimize the sum $$\sum_k [I_j(k) - aP_1(k) - b]^2,$$

as may be seen by taking the partial derivatives with respect to a and b, setting the two resulting terms to 0, and solving.

For each source image-data block $I_j$, a difference image-data block is $D_{j,1}$ formed as follows:

$$D_{j,1} = I_j - a_{j,1}P_1 - b_{j,1}.$$

The statistical variances of the image data of the difference image-data blocks $D_{j,1}$ are generally significantly smaller than the variances of the corresponding source image-data block $I_j$.

In a second preferred embodiment, two prototypical image data blocks $P_1$ and $P_2$ are chosen for each sequence of corresponding source image data blocks I so that K=2. Two scaling coefficients $a_{j,2}$, $b_{j,2}$, and a translation coefficient $c_{j,2}$ are then determined as approximate solutions to the following matrix-vector equation:

$$\begin{pmatrix} \sum_k P_1^2(k) & \sum_k P_1(k)P_2(k) & \sum_k P_1(k) \\ \sum_k P_1(k)P_2(k) & \sum_k P_2^2(k) & \sum_k P_2(k) \\ \sum_k P_1(k) & \sum_k P_2(k) & N \end{pmatrix} \begin{pmatrix} a_{j,2} \\ b_{j,2} \\ c_{j,2} \end{pmatrix} = \begin{pmatrix} \sum_k P_1(k)I_j(k) \\ \sum_k P_2(k)I_j(k) \\ \sum_k I_j(k) \end{pmatrix},$$

where the sums are taken over all of the pixels in the image data block. The three coefficients $a_{j,2}$; $b_{j,2}$; and $c_{j,2}$ are preferably determined to only a fixed-bit accuracy and thus are approximate.

It should be appreciated that the three coefficients $a_{j,2}$; $b_{j,2}$; and $c_{j,2}$ obtained above are those which minimize the sum $$\sum_k [I_j(k) - aP_1(k) - bP_2(k) - c]^2.$$

Difference images are then formed for each source image-data block $I_j$ as follows:

$$D_{j,2} = I_j - a_{j,2}P_1 - b_{j,2}P_2 - c_{j,2}.$$

For appropriate prototypical image-data blocks $P_1$, and $P_2$ the statistical variances of the data in the difference image data blocks $D_{j,2}$ of the second embodiment generally tend to be significantly smaller than variances of the corresponding difference image-data block $D_{j,1}$ of the first embodiment, and, with greater probability, significantly smaller than the statistical variances of the data in the corresponding source image-data block $I_j$.

The procedure of the invention can be extended to greater numbers of prototypical image-data blocks, if desired. For typical sequences of correlated images, it is found that the greater the number of prototypical image-data blocks P selected, the smaller the variance of the data in the resulting difference image-data block tends to be. The number K of prototypical image-data blocks to be selected depends on the nature of the images and the number of correlated images in the sequence. To minimize data storage requirements, it is ordinarily preferred to minimize the number prototypical image data blocks used, consistent with achieving a desired degree of image data compression.

In a preferred embodiment using two prototypical images, for each sequence of source image-data blocks processed, only the two prototypical image data blocks $P_1$ and $P_2$ would be stored, together with—for each of the images in the sequence—two scaling coefficients $a_{j,2}$ and $b_{j,2}$, a translation coefficient $c_{j,2}$, and a difference image-data block $D_{j,2}$. Preferably, both the difference image-data blocks and the two prototypical image data blocks are stored as compressed image data in accordance with a data-compression scheme.

The data compression scheme may be any of the conventional methods for lossless compression of image data. For example, in a particularly preferred embodiment, a differential pulse code modulation scheme with arithmetic coding or Huffman coding is used.

The prototypical image data blocks P may be obtained in a number of ways. For example, in one preferred method using two prototypical image-data blocks, a first prototypical image-data block $P_1$ is an average on a corresponding-pixel by corresponding-pixel basis of all of the corresponding source image-data blocks of the sequence. A subset of corresponding source image-data blocks is then selected from the set of corresponding source image-data blocks of the sequence. The second prototypical image-data block $P_2$ is taken as an average on a corresponding-pixel by corresponding-pixel basis of the source image-data blocks of the subset. Alternatively, two subsets of corresponding source image-data blocks may be selected from the set of source image-data blocks of the sequence. The two prototypical image-data blocks may then be formed by taking respectively the averages of the source image-data blocks of the two subsets on a corresponding-pixel by corresponding-pixel basis More generally, K subsets of corresponding source image-data blocks may be selected from the set of corresponding source image data blocks of the sequence and averages taken of the blocks of each such subset on a corresponding-pixel by corresponding-pixel basis to form respectively K prototypical image-data blocks. If desired, the prototypical image data blocks may be selected on the basis of performing some statistical separation or clustering procedure and choosing a prototypical image for each cluster. In general, the preferred method for selecting prototypical image data blocks depends on the statistics of the image data in the sequence of images.

To reconstruct a source image-data block, the coded prototypical image-data blocks together with the coded data for the difference image-data block and the corresponding scaling and translation constants are used to reconstruct the images by first decompression, followed by an arithmetic linear combination. For example, in the second preferred embodiment with K=2, to reconstruct the j-th image, the compressed prototypical image-data blocks $P_1$ and $P_2$ and the compressed j-th difference image-data block $D_{j,2}$, together with the coefficients $a_{j,2}$; $b_{j,2}$; and $c_{j,2}$, are first decompressed in accordance with the data-compression scheme used to compress the data initially. From the resulting decompressed data, the desired reconstructed source image-data block can be computed from the formula:

$$I_j = D_{j,2} + a_{j,2}P_1 + b_{j,2}P_2 + c_{j,2}.$$

A preferred method of the invention using a single prototypical image-data block $P_1$ was tested on seven bands of synthetic-aperture radar image data of sections of San Francisco. The original means and variances of the pixel values of the seven bands, rounded to the nearest tenth of an integer, were: (63,16), (24.8,5.5), (23.4,15.2), (15.3,61.9), (15.3,290.6), (92.7,2.4), and (8.4, 80.7). A prototypical image-data block was taken as the average of the image data from the seven bands, rounded to the nearest integer which was a multiple of four. The resulting difference image data blocks all had means which, to the nearest tenth of an integer, were zero, and variances which, to the nearest tenth of an integer, were: 9.5, 2.7, 4.1, 5.9, 20, 2.7, and 4.9. The square root of the ratios of the variances of the original source image-data blocks to those of the corresponding difference image data blocks were, respectively, to the nearest tenth of an integer: 1.3, 1.4, 1.9, 3.2, 3.8, 1, and 4. Actual data-compression gains are a function of the particular coding schemes used after forming the difference image data blocks. A fair estimate is that the gain, in bits per pixel, per image is the logarithm to the base 2 of the square root of the ratio of the variances. For the present data, such an estimate gives, to the nearest one hundredth of an integer, the compression gains of 0.39, 0.49, 0.93, 1.68, 1.93, 0.0, and 2.0 bits per pixel, or an average of 1.06 bits per pixel. This estimate does not account for the cost in coding the coefficients $a_{j,1}$ and $b_{j,1}$ and the prototypical image $P_1$. The effect of the latter tends to become less significant as the number of correlated images increases.

In a third preferred embodiment, the images of the sequence are arranged in a convenient order and then corresponding source image-data blocks from earlier images in the sequence are used as prototypical image-data blocks for forming difference image-data blocks for succeeding corresponding image-data blocks in a telescoping fashion. To start the process, the first K images are encoded in any convenient way. Image data from the first images are used as K prototypical image data blocks $P_1, P_2, \ldots, P_K$ for forming a difference image-data block for the K+1st image. Then images 2 through K+1 are used as predictors for the K+2nd image, and again a difference image is stored. The process may be continued, in a telescoping fashion.

It may be preferable to restart the telescoping from time to time in order to avoid having to decode a large number of previous images in order to obtain images far removed from the early images in the sequence.

The third embodiment was tested for K=2 using various of the 210 bands of AVIRIS radar-imaging data (Flight 4, Run 10, Monterey, Calif., Vicar label) The original data was given as 16 bits per pixel, stored as two 8 bit bytes. It should be noted, however, that 12 bits would have sufficed. The compression results are listed in Table I below. Each band designates an image.

TABLE I

| Band | Bytes | bits/pixel |
|---|---|---|
| 3 | 218835 | 5.6238 |
| 4 | 217639 | 5.5931 |
| 5 | 213197 | 5.4790 |
| 6 | 209343 | 5.3799 |
| 7 | 206583 | 5.3090 |
| 8 | 203021 | 5.2174 |
| 9 | 200631 | 5.1560 |
| 10 | 199314 | 5.1222 |
| 11 | 199083 | 5.1162 |
| 31 | 228922 | 5.8831 |
| 32 | 220038 | 5.6548 |
| 45 | 156643 | 4.0256 |
| 55 | 154427 | 3.9686 |
| 65 | 182337 | 4.6859 |
| 75 | 201110 | 5.1683 |
| 85 | 118056 | 3.0339 |
| 95 | 122222 | 3.1410 |
| 105 | 123126 | 3.1642 |
| 115 | 123468 | 3.1730 |
| 125 | 141780 | 3.6436 |
| 135 | 46130 | 1.1855 |
| 145 | 126208 | 3.2434 |
| 155 | 127892 | 3.2867 |
| 165 | 134972 | 3.4686 |
| 175 | 144478 | 3.7129 |

Bands 185 and 199 were not well predicted by their previous two bands. AVIRIS bands 192, 193, 194 and 195 were all 0, and band 191 was very weak. Coding the all-zero bands was expected to be very simple; there may have been an instrumental error. Also band 196 is all 61440 except for the last row, indicating perhaps again instrumental error.

For comparison, standard compression using individual source image data yielded compression ratios of about 2 to 1. As may be seen in Table I the ratios obtained using the disclosed method are significantly higher.

It is not intended to limit the present invention to the specific embodiments described above. It is recognized that changes may be made in the systems and processes specifically described herein without departing from the scope and teaching of the present invention, and it is intended to encompass all other embodiments, alternatives, and modifications consistent with the invention.

We claim:

1. A method for encoding data representative of a sequence of images which includes correlated images, comprising:

(a) digitizing each image in the sequence of images to form a sequence of arrays of source image data, each array of source image data being representative of a corresponding one of the images of the sequence;

(b) partitioning each array of source image data into a plurality of source image-data blocks, each source image-data block having source image-data elements, each source image-data element of a block being indexably associated with a unique block data-element index, corresponding source image-data blocks associated in turn with each array of the sequence of arrays of source image data defining a sequence of source image-data blocks, the sequences of source image-data blocks so defined being equal in number to the number of source image-data blocks into which each array is partitioned;

(c) for each sequence of source image-data blocks, deriving at least one prototypical image-data block from at least a portion of the source image data of the sequence, each prototypical image-data block having prototypical image-data elements, each prototypical image-data element being indexably associated with one of the block data-element indices;

(d) for each source image-data block in each sequence of source image-data blocks, determining an associated translation coefficient and a number of associated scaling coefficients equal to the number of prototypical image-data blocks associated with the sequence, the scaling coefficients and the translation coefficient respectively having values to at least approximately minimize a first sum of squared summands, each summand being indexably associated with one of the block data-element indices and being the square in sum of the translation coefficient plus a second sum of each of the scaling coefficients in turn multiplied by an element indexably associated with the summand block data-element index of the prototypical image-data block associated with the scaling coefficient minus an element indexably associated with the summand block data-element index of the source image-data block, the first sum being taken over all of the block data-element indices of the source image-data block;

(e) for each source image-data block in each sequence of source image-data blocks, forming a corresponding difference image-data block having difference image-data elements, each difference image-data element being indexably associated with one of the block data-element indices which defines a difference-element index, each difference image-data element being derived from an element indexably associated with the difference-element index of the source image-data block minus the translation coefficient associated with the source image-data block minus the sum in turn of each scaling coefficient associated with the source image-data block multiplied by the element indexably associated with the difference-element index of the prototypical image-data block associated with the scaling coefficient;

(f) subjecting each difference image-data block to an image-data-compression procedure to form a set of data-compression-encoded difference image-data elements; and (g) storing each set of data-compression-encoded difference image-data elements in digital storage in association with the scaling coefficients and the translation coefficient associated with the corresponding source image-data block.

2. The method of claim 1 further comprising:

(h) subjecting each prototypical image-data block to an image-data-compression procedure to form a set of data-compression-encoded prototypical image-data elements; and (i) storing each set of data-compression-encoded prototypical image-data elements in digital storage.

3. The method of claim 2 in which each image block represented by a source image-data block is essentially rectangular.

4. The method of claim 1 in which each prototypical image-data block is obtained by averaging on a corresponding-element-by-corresponding-element basis elements of at least a subset of the source image-data blocks in the associated sequence of source image-data blocks.

5. The method of claim 1 in which each prototypical image-data block represents a source image-data block, the formation of difference image-data blocks being carried out sequentially in a telescoping fashion.

6. The method of claim 2 in which the image-data-compression procedure is a differential pulse-code modulation scheme with arithmetic coding.

7. The method of claim 2 in which the image-data compression procedure is a differential pulse-code modulation scheme with Huffman coding.

8. The method of claim 1 in which two prototypical image-data blocks are derived for each sequence of source image-data blocks.

9. The method of claim 1 in which a single prototypical image-data block is derived for each sequence of source image-data blocks.

10. The method of claim 3 in which each image block is essentially square having a size of 64 pixels by 64 pixels.

11. The method of claim 3 in which each image block is essentially square having a size of 128 pixels by 128 pixels.

12. A method for encoding data representative of a sequence of images which includes correlated images, comprising:

(a) digitizing each image in the sequence of images to form a sequence of arrays of source image data, each array of source image data being representative of a corresponding one of the images of the sequence;

(b) partitioning each array of source image data into a plurality of source image-data blocks, each source image-data block having source image-data elements, each source image-data element of a block being indexably associated with a unique block data-element index, corresponding source image-data blocks associated in turn with each array of the sequence of arrays of source image data defining a sequence of source image-data blocks, the sequences of source image-data blocks so defined being equal in number to the number of source image-data blocks into which each array is partitioned;

(c) for each sequence of source image-data blocks, deriving at least one prototypical image-data block from at least a portion of the source image data of the sequence, each prototypical image-data block having prototypical image-data elements, each prototypical image-data element being indexably associated with one of the block data-element indices;

(d) for each source image-data block in each sequence of source image-data blocks, determining an associated translation coefficient and a number of associated scaling coefficients equal to the number of prototypical image-data blocks associated with the sequence, the scaling coefficients and the translation coefficient respectively having values to at least approximately minimize a first sum of squared summands, each summand being indexably associated with one of the block data-element indices and being the square in sum of the translation coefficient plus a second sum of each of the scaling coefficients in turn multiplied by an element indexably associated with the summand block data-element index of the prototypical image-data block associated with the scaling coefficient minus an element indexably associated with the summand block data-element index of the source image-data block, the first sum being taken over all of the block data-element indices of the source image-data block;

(e) for each source image-data block in each sequence of source image-data blocks, forming a corresponding difference image-data block having difference image-data elements, each difference image-data element being indexably associated with one of the block data-element indices which defines a difference-element index, each difference image-data element being derived from an element indexably associated with the difference-element index of the source image-data block minus the translation coefficient associated with the source image-data block minus the sum in turn of each scaling coefficient associated with the source image-data block multiplied by the element indexably associated with the difference-element index of the prototypical image-data block associated with the scaling coefficient;

(f) subjecting each difference image-data block to an image-data-compression procedure to form a set of data-compression-encoded difference image-data elements; and (g) transmitting over a communications channel each set of data-compression-encoded difference image-data elements and the scaling coefficients and the translation coefficient associated with the corresponding source image-data block.

13. The method of claim 12 further comprising:
   (h) subjecting each prototypical image-data block to an image-data-compression procedure to form a set of data-compression-encoded prototypical image-data elements; and
   (i) transmitting over the communications channel each set of data-compression-encoded prototypical image-data elements.

14. The method of claim 13 in which each image block represented by a source image-data block is essentially rectangular.

15. The method of claim 14 in which each image block is essentially square having a size of 64 pixels by 64 pixels.

16. The method of claim 14 in which each image block is essentially square having a size of 128 pixels by 128 pixels.

17. The method of claim 12 in which each prototypical image-data block is obtained by averaging on a corresponding-element-by-element-corresponding basis elements of at least a subset of the source image-data blocks in the associated sequence of source image-data blocks.

18. The method of claim 12 in which each prototypical image-data block represents a source image-data block, the formation of difference image-data blocks being carried out sequentially in a telescoping fashion.

19. The method of claim 13 in which the image-data-compression procedure is a differential pulse-code modulation scheme with arithmetic coding.

20. The method of claim 13 in which the image-data compression procedure is a differential pulse-code modulation scheme with Huffman coding.

21. The method of claim 12 in which two prototypical image-data blocks are derived for each sequence of source image-data blocks.

22. The method of claim 12 in which a single prototypical image-data block is derived for each sequence of source image-data blocks.

* * * * *